D. J. PENNO.
NON-SKIDDING ATTACHMENT FOR AUTOMOBILE WHEELS.
APPLICATION FILED OCT. 29, 1913.
1,105,374.
Patented July 28, 1914.
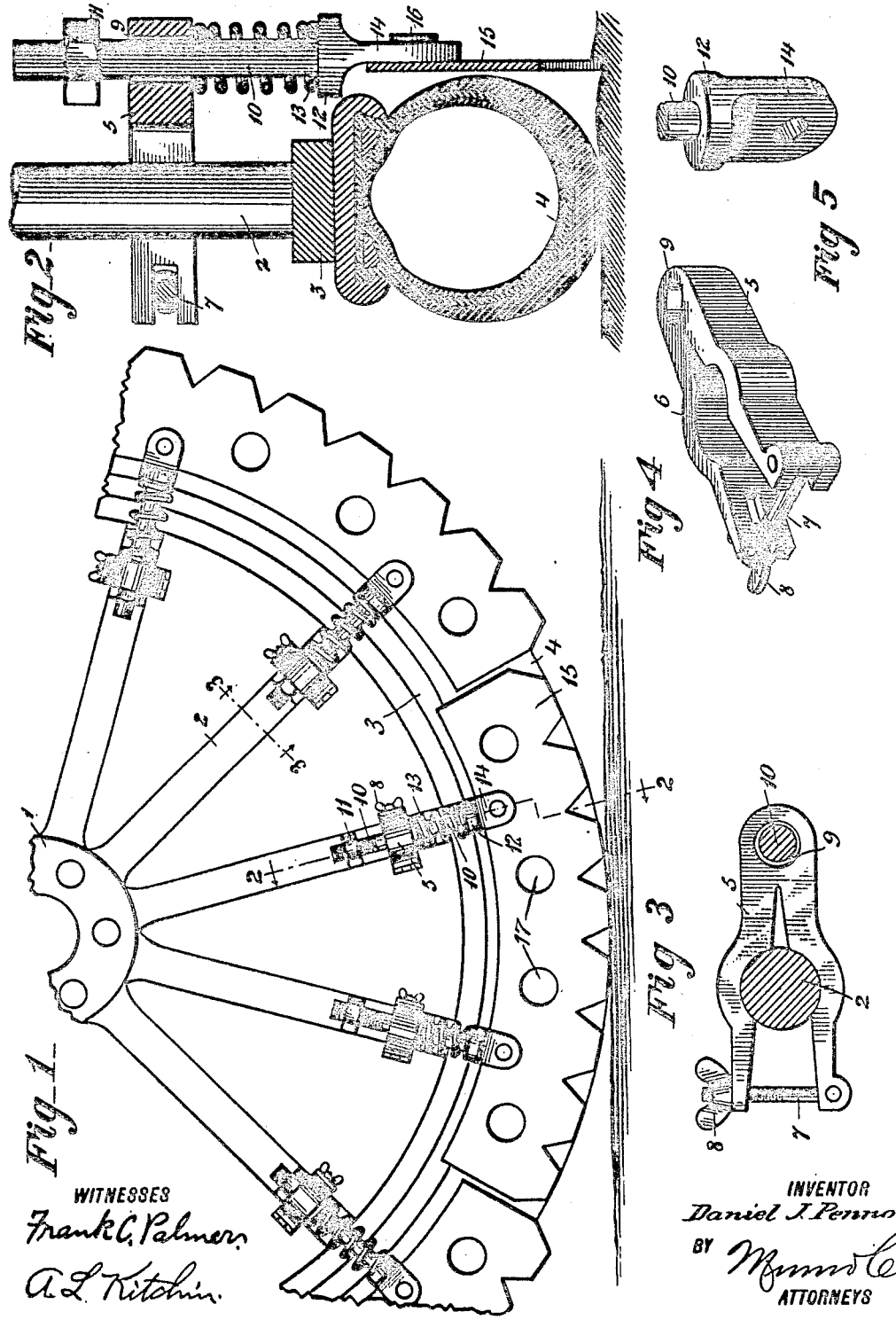
WITNESSES
Frank C. Palmer
A. L. Kitchin
INVENTOR
Daniel J. Penno
BY
ATTORNEYS

UNITED STATES PATENT OFFICE.

DANIEL J. PENNO, OF TRINIDAD, COLORADO.

NON-SKIDDING ATTACHMENT FOR AUTOMOBILE-WHEELS.

1,105,374.  Specification of Letters Patent.  Patented July 28, 1914.

Application filed October 29, 1913. Serial No. 798,011.

*To all whom it may concern:*

Be it known that I, DANIEL J. PENNO, a citizen of the United States, and a resident of Trinidad, in the county of Las Animas and State of Colorado, have invented a new and Improved Non-Skidding Attachment for Automobile-Wheels, of which the following is a full, clear, and exact description.

This invention relates to improvements in anti-skidding devices, and particularly to devices designed to be detachably secured to automobile wheels.

The object in view is to provide an improved structure readily attached and removed, but when in place to positively prevent any appreciable skidding or side movement of the wheel.

Another object in view is to provide an anti-skidding device arranged in a plurality of sections and adapted to engage the earth as the wheel rotates but formed with means for yielding when a hard substance is engaged.

A still further object of the invention is to provide a plurality of yielding segments connected with a wheel and adapted to engage the ground at one side of the wheel so as to prevent skidding, these segments being so connected with the wheel as to resist sliding of the wheel in a forward direction as well as skidding.

In carrying out the object of the invention a plurality of segmental plates are provided arranged with roughened lower edges so as to readily engage the earth. These segments are made of a size to conform to the size of the wheel on which they are mounted, and are provided with supporting members held in place by suitable clamps adjustably clamped to the spokes of the wheel. In order that these segmental members may engage and press the earth to a certain extent, but yield when striking a hard surface, a spring is provided for resiliently pressing the segments into the earth.

In the accompanying drawing—Figure 1 is a side view of part of an automobile wheel with an embodiment of the invention applied thereto; Fig. 2 is a section through Fig. 1 on line 2—2; Fig. 3 is a fragmentary sectional view approximately on line 3—3 of Fig. 1; Fig. 4 is a detailed perspective view of the spoke clamp; Fig. 5 is a detailed fragmentary perspective view of one end of the segment guiding rod.

Referring to the accompanying drawing by numeral 1 indicates an automobile wheel of any kind which is provided with spokes 2, felly 3 and tire 4. These constructions may be of any desired kind without departing from the spirit of the invention, as the invention resides not in the wheel but in the attachment connected therewith. A clamping member 5 is arranged to engage each of the spokes 2, as shown in Fig. 1. Each of the clamping members 5 is formed with a portion 6 for clamping the spokes 2, and with a pivotally mounted bolt 7 for pressing the sides of members 5 against the spokes. A winged nut 8 is provided so as to permit easy operation of bolt 7. At the end of each of the clamping members 5 opposite bolt 7 is an aperture 9 designed to receive a bar 10 which is loosely fitted therein, as shown in Fig. 2. The various clamps 5 may be connected with spokes 2 at any desired point. Each of the clamps is provided with a guiding bar 10 threaded at the upper end for receiving the limiting nut 11, and formed with a shouldered portion 12 at the bottom against which presses spring 13. Spring 13 is designed to press against shoulder 12 and against the end of the clamping members 5 associated therewith, whereby the shoulder 12 is normally pressed toward the ground. Bar 10 below shoulder 12 is formed with extensions 14, riveted, bolted, or otherwise secured to a segmental contact member 15. The connection 16 of member 14 with the segment 15 is preferably pivotal so as to allow a proper yielding action. The segmental members 15 are provided with apertures 17 for permitting the earth and other foreign matter pressing between members 15 and the tire 4 to pass to the exterior of the segment 15.

In operation the various clamping members may be applied and removed quickly without the use of tools as the winged nuts 8 may be easily operated by the fingers. When the various segments and associated parts have been connected to the wheel it is ready for operation. In passing over the earth spring 13 will cause the lower edge of the various segments 15 to enter the earth and thereby effectually prevent any side movement or skidding of the wheels. The edge of the segment 15 may be smoothed or roughened in any desired manner, as for instance by being formed with teeth. When the wheel engages anything hard, as for instance a hard pavement, the segment 15 will move upwardly, as shown in Fig. 1, but will of course press tightly against the hard pavement and thereby prevent a skidding action. The action of the spring 13 may be varied by varying the position of nut 11. As clearly shown in Fig. 2, the segment 15 and associated parts have been raised so as to pass over a hard surface. When this hard surface is passed the segment 15 will move down automatically until nut 11 engages the top of clamp 5. If it should be desired to cause the segment 15, shown in Fig. 2, to further enter the ground nut 11 will be rotated so as to move farther from clamping member 5. It will of course be evident that nut 11 could be adjusted for holding the segment 15 from contact with the earth. It will also be evident that the various clamping members 5 may be adjusted up and down on their respective spokes so as to assist nut 11 in causing a proper engagement of the various segments with the ground.

What I claim is:—

1. In an anti-skidding device of the character described, a plurality of segmental plates, a plurality of bars connected with each of said plates, a spring acting on each of said bars for moving said bars radially, and a clamping bar acting as an abutment for said spring, and as a guiding means for said bars, said clamping member being adjustably connected to a wheel, said clamping member being formed with a pair of clamping arms engaging said wheel, and a pivotally mounted clamping bolt for pinching said arms against said wheel.

2. In an anti-skidding device of the character described, a plurality of segmental plates, a bar connected with each of said plates, a clamping member for holding said bar in position on a wheel, said clamping member being provided with an aperture in which said bar is slidingly positioned, and a pair of resilient jaws, a clamping bolt arranged at the outer end of said jaws for clamping the jaws against the spoke of a wheel, and a spring associated with said bar and pressing at one end against said segment, and at the other end against said clamping member.

In testimony whereof I have signed my name to this specification in the presence of two subscribing witnesses.

DANIEL J. PENNO.

Witnesses:
DAVID R. HINDMAN,
DON C. STRATTON.

Copies of this patent may be obtained for five cents each, by addressing the "Commissioner of Patents. Washington, D. C."